June 13, 1950 A. STADLER 2,511,380
RADIANT CELL GAS BURNER
Filed Oct. 6, 1945 2 Sheets-Sheet 1

INVENTOR.
Albert Stadler
By Fred Gerlach
atty.

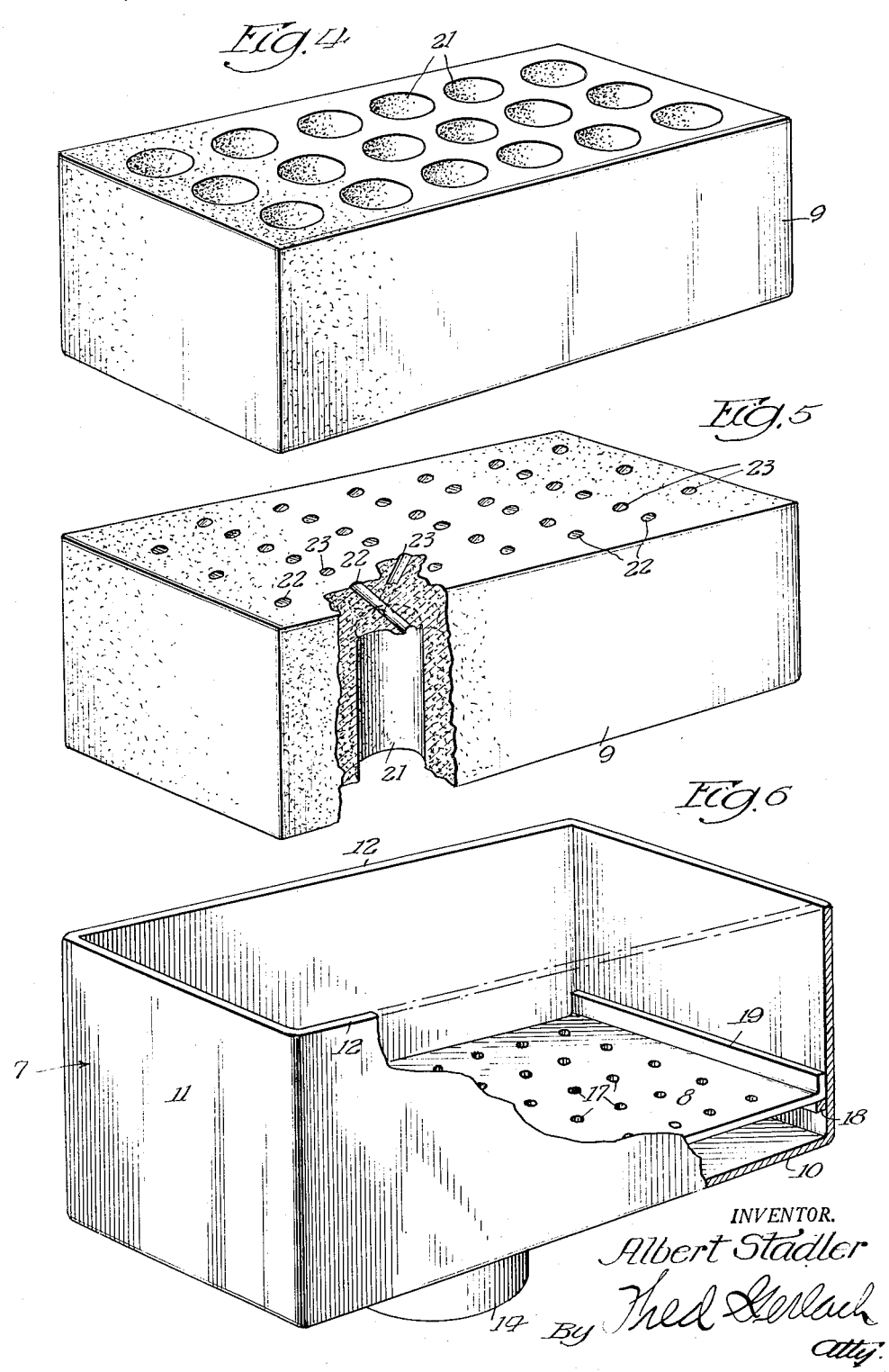

Patented June 13, 1950

2,511,380

UNITED STATES PATENT OFFICE 2,511,380

RADIANT CELL GAS BURNER

Albert Stadler, Rockford, Ill., assignor to Eclipse Fuel Engineering Co., Rockford, Ill., a corporation of Illinois Application October 6, 1945, Serial No. 620,788

2 Claims. (Cl. 158—116)

The present invention relates generally to gaseous fuel burners. More particularly the invention relates to that type of burner which is known commercially as a radiant burner, has special utility in connection with a heating apparatus, such as a furnace or boiler, and as its principal components or parts comprises: (1) a hollow, horizontally elongated, open top, metallic supporting structure which is adapted for disposition in the combustion chamber of the heating apparatus and has at the bottom thereof an inlet pipe for supplying it with gaseous fuel under pressure; and (2) a brick-like body which is formed of insulating or heat resistant refractory material, is disposed within the supporting structure in spaced relation with the bottom wall of the latter, has formed therein a plurality of laterally spaced, cylindrical wells with the bottom thereof terminating above the bottom surface of the body, embodies in its bottom portion upwardly extending ducts for supplying the fuel into the bottom portions of the wells from the space between the bottom surface of the body and the bottom wall of the supporting structure, and is adapted in connection with burning of the fuel in the wells to become incandescent to the end that the walls of the combustion chamber will be heated by radiant heat.

One object of the invention is to provide a gaseous fuel burner of this type which is an improvement upon, and has certain advantages over, previously designed burners of the same general character and is characterized by high efficiency and simplicity of design and construction.

Another object of the invention is to provide a gaseous fuel burner of the type under consideration in which the body has for each well therein two laterally spaced, diagonally extending, oppositely inclined port-like ducts which serve so to introduce the fuel into the associated well that it impinges against, and swirls upwards around, the portion of the body that defines the side wall of the associated well.

Another object of the invention is to provide a radiant type gaseous fuel burner in which the hollow supporting structure has in the bottom portion thereof and in spaced relation with its bottom wall and the bottom surface of the well equipped body a horizontally extending perforated baffle plate which serves evenly to distribute the gaseous fuel under the body prior to upward passage or flow into the wells via the diagonally extending ducts in the bottom portion of the body.

A further object of the invention is to provide a radiant gaseous fuel burner of the type and character last mentioned in which the perforated baffle plate has along certain margins thereof upturned or upwardly extending right angle flanges which serve to support the body of refractory material so that it is spaced above the baffle plate proper.

A still further object of the invention is to provide a radiant type gaseous fuel burner which is generally of new and improved construction, effectively and efficiently fulfills its intended purpose, has a comparatively long life and is capable of being manufactured at a low cost.

Another objects of the invention and the various advantages and characteristics of the present gaseous fuel burner will be apparent from a consideration of the following detailed description.

The invention consist in the several novel features which are hereinafter set forth and are more particularly defined by claims at the conclusion hereof.

In the drawings which accompany and form a part of this specification or disclosure and in which like numerals of reference denote corresponding parts throughout the several views.

Figure 1:
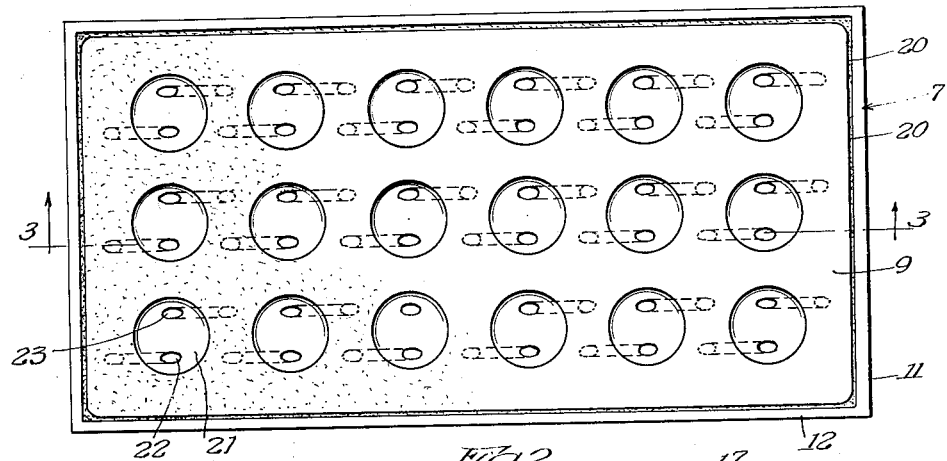
Figure 1 is a plan view of a radiant type gaseous fuel burner embodying the invention.
Figure 2:
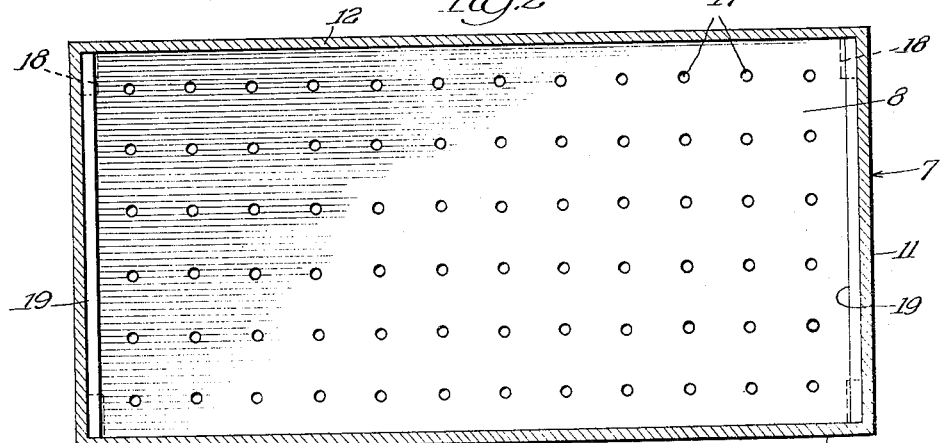
Figure 2 is a horizontal plan section illustrating in detail the construction, arrangement and design of the perforated baffle plate which serves evenly to distribute the gaseous fuel under the body of refractory material prior to upward passage or flow of the fuel into the wells via the diagonally extending ducts in the bottom portion of the body.
Figure 3:
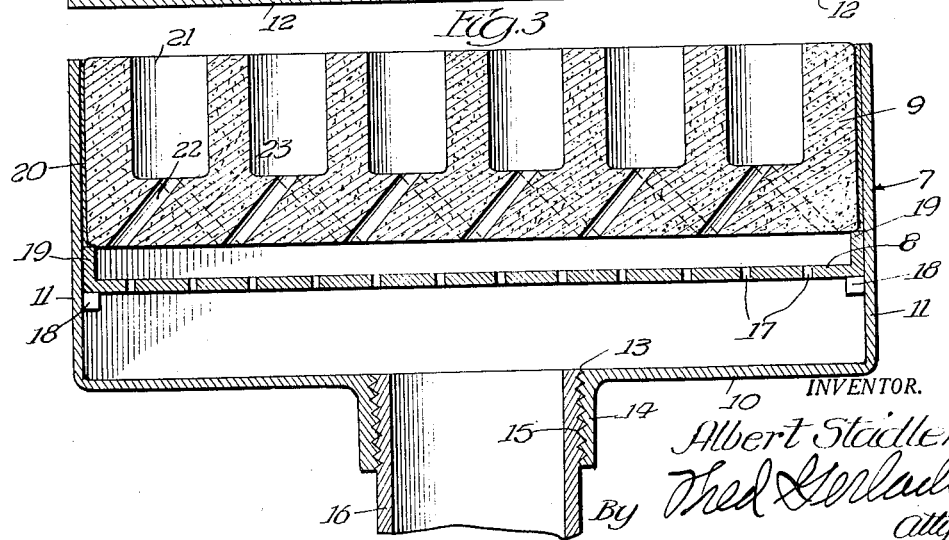

Figure 3 is a vertical longitudinal section taken on the line 3—3 of Figure 1 and showing in detail the manner in which the upwardly extending right angle flanges on the baffle plate serve to support the body of refractory material so that it is spaced above the baffle plate proper, and also illustrating the arrangement of the pairs of diagonally extending port-like ducts for introducing the gaseous fuel under pressure into the wells so that it swirls upwards around the portions of the body that defines the side walls of the wells;

Figure 4 is a top perspective of the body of refractory material;

Figure 5 is a bottom perspective of the body, parts being broken away and other parts being shown in section for purposes of illustration; and Figure 6 is a perspective of the hollow supporting structure in which the body of refractory material is mounted.

The burner which is shown in the drawings constitutes the preferred form or embodiment of the invention and is designed and adapted to burn gaseous fuel. It is essentially of the radiant type, is adapted for disposition in the combustion chamber of a heating apparatus (not shown), such, for example, as a furnace or boiler, and comprises a hollow, horizontally elongated, open top supporting structure 7, a baffle plate 8 and a body 9 of insulating or heat resistant refractory material.

The supporting structure 7 is preferably formed of cast metal or fabricated steel and is box-like so far as shape or configuration is concerned. It is essentially in the form of a unit and comprises a flat bottom wall 10, a pair of flat end walls 11 and a pair of flat side walls 12. The bottom wall 10 has in the central portion thereof a circular fuel inlet hole 13 and embodies an annular depending flange 14, the upper end of which is formed integrally with the hole defining portion of the bottom wall. As shown in Figure 3, the flange 14 has an internal screw thread 15. Gaseous fuel under pressure is introduced into the bottom portion of the supporting structure 7 by way of a supply pipe 16, the discharge end of which is externally threaded and is screwed into the flange 14. It is contemplated that the gaseous fuel which is delivered into the bottom portion of the supporting structure by way of the supply pipe 16 will be a combustible mixture of air and a high calorific or other gas. The end walls 11 of the supporting structure 7 extend upwards at right angles to the bottom wall 10 and have the bottom margins thereof formed integrally with the end margins of the bottom wall. The side walls 12 of the supporting structure are positioned in laterally spaced and opposed relation and extend upwards from, and at right angles to, the bottom wall. The bottom margins of the side walls are formed integrally with the side margins of the bottom wall and the end margins of the side walls are joined to the end margins of the end walls. The top edges of the end and side walls of the supporting structure 7 are coplanar.

The baffle plate 8 extends across the bottom portion of the supporting structure and is spaced a comparatively small distance above the bottom wall 10. It corresponds in shape and size to the bottom wall and has substantially throughout its entire area laterally spaced, small sized, vertically extending perforations 17. Lugs 18 serve to support the baffle plate 8 in spaced relation with the bottom wall 10 of the supporting structure. Such lugs are preferably four in number and are welded or otherwise fixedly secured to the joined together end margins of the end and side walls 11 and 12. Preferably the corners of the baffle plate rest loosely on the lugs 18, although, if desired, they may be welded to the lugs in order permanently to connect the baffle plate to the supporting structure. The end margins of the baffle plate are provided with integral, upwardly extending, right angle flanges 19 and these fit against the inner faces of the end walls 11 of the supporting structure and have coplanar upper edges. The gaseous fuel which enters the lower portion of the supporting structure by way of the supply pipe 16 flows upwards through the perforations 17 in the baffle plate. The purpose or function of the baffle plate is to control the gaseous fuel so that it flows upwards in an evenly distributed manner throughout all portions of the supporting structure.

The body 9 of insulating or heat resistant refractory material is brick-like in character and is disposed within the upper portion of the supporting structure 7. It has flat surfaces and rests on, and is supported by, the flanges 19 along the end margins of the baffle plate 8. As shown in Figure 3, the end margins of the bottom surface of the body 9 rest on the upper or top edges of the flanges 19. Such flanges serve, not only to support the body 9 against downward displacement with respect to the supporting structure 7, but also to hold the body in a position wherein it is spaced a comparatively small distance above the baffle plate proper. The end and side surfaces of the body are preferably bonded to the inner surfaces of the end and side walls of the supporting structure by a cement coating 20 in order that the body is in connected relation with the supporting structure. The top or upper surface of the body 9 is flush with the upper edges of the end and side walls of the supporting structure with the result that such walls protect the body against damage or injury. The upper portion of the body 9 is provided with a plurality of laterally spaced, longitudinally extending rows of wells 21. The latter serve as combustion chambers for the gaseous fuel and have open upper ends, as shown in the drawings. The bottoms of the wells terminate an appreciable distance above the bottom surface of the body 9. The bottom portion of the body 9 has formed therein pairs of laterally spaced, diagonally extending, oppositely inclined port-like ducts 22 and 23 for supplying the gaseous fuel from the space between the baffle plate 8 and the bottom surface of the body 9 into the bottom portions of the wells 21 are truly straight. The ducts 22 extend at approximately a 45° angle with respect to the horizontal and have the lower ends thereof opening through the bottom surface of the body 9 and their upper ends opening through the surfaces of the body that define the bottoms of the wells. They are arranged in laterally spaced, longitudinal rows, as best shown in Figures 1 and 3 of the drawings. The other port-like ducts, i. e., the ducts 23, are truly straight, are upwardly inclined in the opposite direction and extend at approximately a 45° angle with respect to the horizontal. They also are arranged in laterally spaced, longitudinally extending rows and have the lower ends thereof opening through the bottom surface of the body 9 and their upper ends opening through the surfaces of the body that define the well bottoms. The upper ends of the ducts 22 are located at one side of the well bottoms and the upper ends of the ducts 23 are located at the other sides of the well bottoms. Because of the arrangement and diagonal position of the ducts 22 and 23 the streams of gaseous fuel which enter the wells impinge against the lower portions of the side walls of the wells and swirl upwards in loose spirals. Because the fuel expands as it enters the wells and due to the fact that the velocity of the fuel is reduced due to impingement against the well side walls in connection with upward swirling action combustion of the fuel takes place substantially entirely within the wells. Due to burning of the fuel in the wells the upper portion of the body 9 becomes incandescent and heating of the combustion chamber in which the body is disposed is effected by radiant heat.

The herein described radiant type gaseous fuel burner effectively and efficiently fulfills its intended purpose and because of the construction thereof it has a comparatively long life and is capable of being manufactured at a low cost. By reason of the fact that fuel is supplied to each of the wells by a pair of laterally spaced or offset, diagonally extending, oppositely inclined ducts an effective swirling action of the fuel is obtained to the end that burning or combustion takes place substantially entirely within the wells. In view of the fact that the burner includes the perforated baffle plate 8 between the bottom wall and the supporting structure and the bottom surface of the body the gaseous fuel under pressure is evenly distributed under the body prior to entry into the ducts 22 and 23 and hence there is a substantially uniform supply or feed of fuel into the wells.

The invention is not to be understood as restricted to the details set forth since these may be modified within the scope of the appended claims without departing from the spirit and scope of the invention.

Having thus described the invention what I claim as new and desire to secure by Letters Patent is:

1. A radiant type burner comprising a cup shaped supporting structure having means connected to the bottom wall thereof for supplying the bottom portion of its interior with gaseous fuel under pressure, a body of refractory material supported in the upper portion of the supporting structure, having formed in its upper portion a plurality of laterally spaced, cylindrical, vertically extending, open top wells with flat bottoms, and embodying in its lower portion a plurality of straight, cylindrical ducts leading from the bottom surface of the body to and through the well bottoms, serving to introduce the gaseous fuel in stream form into the wells from the bottom portion of the supporting structure, and extending at approximately 45° angles with respect to the bottoms of the wells and tangentially with respect to circles in concentric relation with the sides of the wells in order to cause the streams of fuel to impinge against the lower portions of the sides of the wells and then swirl upwards in distended spirals, and a baffle plate extending across the bottom portion of the supporting structure, disposed between, and in spaced and parallel relation with, the bottom wall of the supporting structure and the bottom surface of the body, embodying small sized, substantially equidistantly spaced perforations throughout its area, and serving uniformly to distribute the gaseous fuel under the body prior to upflow through the ducts.

2. A radiant type burner comprising a cup shaped supporting structure having means connected to the bottom wall thereof for supplying the bottom portion of its interior with gaseous fuel under pressure, a body of refractory material disposed in the upper portion of the supporting structure, having formed in its upper portion a plurality of laterally spaced, cylindrical, vertically extending, open top wells with flat bottoms, and embodying in its lower portion a plurality of straight, cylindrical ducts leading from the bottom surface of the body to and through the well bottoms, serving to introduce the gaseous fuel in stream form into the wells from the bottom portion of the supporting structure, and extending at approximately 45° angles with respect to the well bottoms and tangentially with respect to circles in concentric relation with the sides of the wells in order to cause the streams of fuel to impinge against the lower portions of the sides of the wells and then swirl upwards in distended spirals, and a baffle plate corresponding in size to, and extending across the bottom portion of, the supporting structure, disposed between, and in spaced and parallel relation with, the bottom wall of said supporting structure and the bottom surface of the body, embodying small sized, substantially equidistantly spaced perforations throughout its area, serving uniformly to distribute the fuel under the body prior to upflow through the ducts, and having upwardly extending marginal flanges abutting directly against the adjacent portions of the continuous side wall of the structure and on which the superjacent portions of the body rest.

ALBERT STADLER.

REFERENCES CITED

The following references are of record in the file of this patent:

UNITED STATES PATENTS

| Number | Name | Date |
|---|---|---|
| 1,206,397 | Yost et al. | Nov. 28, 1916 |
| 1,334,309 | McKee | Mar. 23, 1920 |
| 2,070,859 | Howe | Feb. 16, 1937 |
| 2,122,132 | Docking | June 28, 1938 |
| 2,302,751 | Howe | Nov. 24, 1942 |

FOREIGN PATENTS

| Number | Country | Date |
|---|---|---|
| 22,991 | Great Britain | Dec. 8, 1904 |
| 624,438 | Germany | Jan. 21, 1936 |